No. 731,405. PATENTED JUNE 16, 1903.
W. K-L. DICKSON.
STEREOSCOPIC APPARATUS.
APPLICATION FILED JULY 20, 1898.
NO MODEL. 2 SHEETS—SHEET 1.
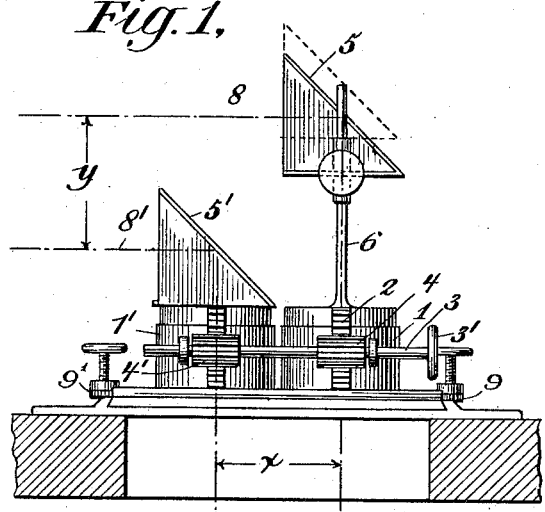
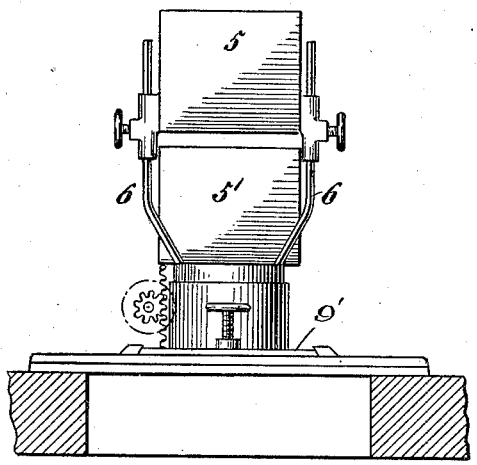
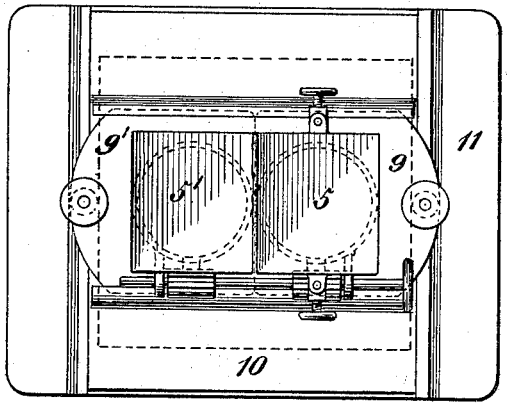
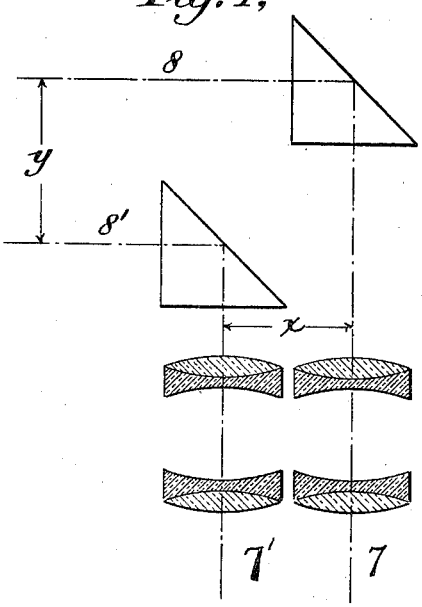
WITNESSES:
D. H. Raymond
H. A. Cox
INVENTOR
W. K-L. Dickson
BY
E. M. Marble & Son
ATTORNEYS No. 731,405. PATENTED JUNE 16, 1903.
W. K-L. DICKSON.
STEREOSCOPIC APPARATUS.
APPLICATION FILED JULY 20, 1898.
NO MODEL. 2 SHEETS—SHEET 2.
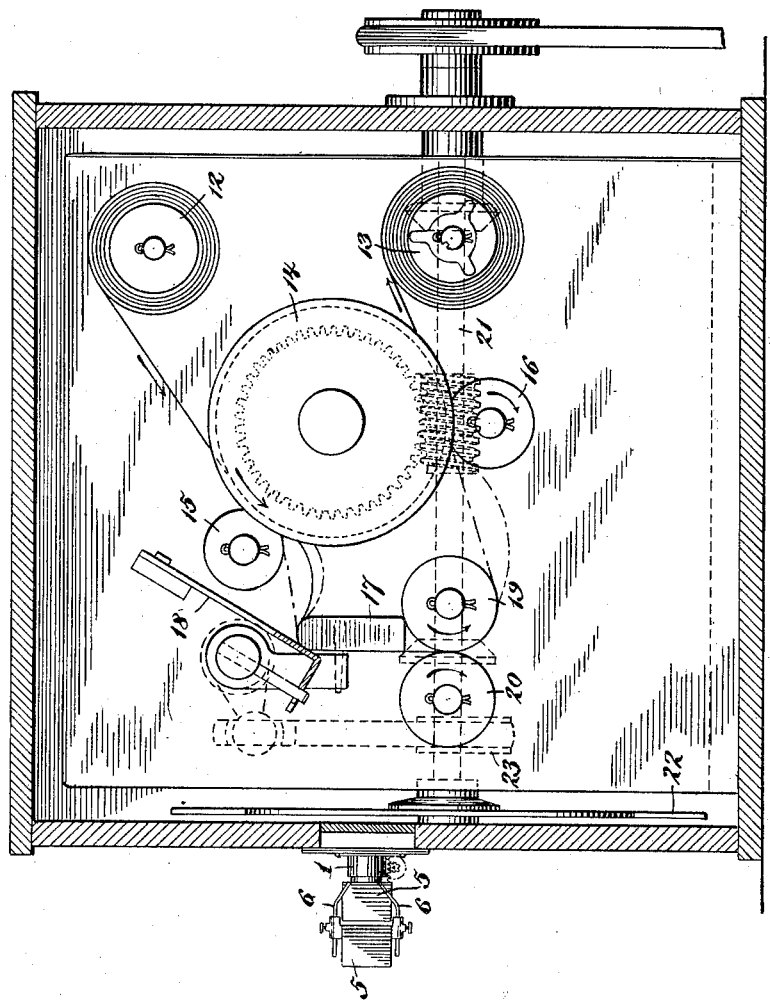
WITNESSES:
INVENTOR
W. K-L. Dickson
BY
ATTORNEYS No. 731,405. Patented June 16, 1903.

UNITED STATES PATENT OFFICE.

WILLIAM KENNEDY-LAURIE DICKSON, OF LONDON, ENGLAND.

STEREOSCOPIC APPARATUS.

SPECIFICATION forming part of Letters Patent No. 731,405, dated June 16, 1903.

Application filed July 20, 1898. Serial No. 686,415. (No model.)

*To all whom it may concern:*

Be it known that I, WILLIAM KENNEDY-LAURIE DICKSON, a subject of the Queen of Great Britain, residing at London, England, have invented certain new and useful Improvements in Stereoscopic Apparatus; and I do hereby declare the following to be a full, clear, and exact description of the invention, such as will enable others skilled in the art to which it appertains to make and use the same.

My invention relates to improvements in apparatus for taking stereoscopic photographs and for exhibiting the same; and it consists in the provision of means for varying the angle of divergence between the axes of the pencils of light by which the twin stereoscopic pictures are produced or transmitted to the eye without varying the distance between the twin images on the photographic plate or on the stereoscopic picture-card, and for bringing the centers of the images on the photographic plate much closer together than the distance between the axes of the pencils of light by which said images are produced, and for obviating the necessity of cutting apart, transposing, and reconnecting the twin pictures of photographic prints made from a stereoscopic negative in order to prepare the same for exhibition, in the provision of means for varying the distance between the twin lenses, and generally in the novel combination, construction, and arrangement of the parts.

In the taking of stereoscopic photographs it is sometimes desirable to vary the angle of divergence between the axes of the pencils of light by which the twin images are produced, so as to exaggerate or diminish the effect of perspective produced. In the taking of consecutive series of stereoscopic pictures of moving objects, such as are to be employed in the reproduction to the eye of the movements of such objects in what are known as "consecutive-view" or "moving-picture" apparatus, it is very desirable to bring the twin images much closer together upon the photographic plate or film than the distance between the axes of the pencils of light by which those images are produced. The photographs usually employed in consecutive-view apparatus are comparatively small, and if the distance between the centers of the twin images produced by a stereoscopic consecutive-view camera be the same as the distance between the centers of the lenses of an ordinary stereoscopic camera there is a great waste of film, and the inertia of the excessively-wide strip of film seriously interferes with the taking of pictures in such rapid succession as is desirable for the production of the desired effects. Furthermore, in the making of stereoscopic pictures from ordinary stereoscopic negatives it is necessary to cut apart the twin pictures of the photographic print, transpose them, and reconnect them or mount them side by side on a common support. It is impracticable to do this with the large number of prints required for a single set of pictures of a consecutive-view exhibiting apparatus.

The objects of my invention are, first, to provide means for varying in stereoscopic cameras or exhibiting apparatus the degree of perspective effect produced and for bringing the images much closer together than is ordinarily the case in stereoscopic negatives or pictures, such images, however, being in fact substantially the same as though observed from points more widely separated than the actual distance between their centers; second, to provide means for obviating the necessity of transposing the twin pictures of stereoscopic photographic prints, and, third, to make the apparatus simple, durable, efficient, and as inexpensive as possible. These objects are attained in the invention herein described, and illustrated in the drawings which accompany and form a part of this specification, in which the same reference-numerals indicate the same or corresponding parts, and in which—

Figure 1 is a plan view of the lens-mountings, prisms, and connected parts of a stereoscopic photographic apparatus embodying my invention detached from the camera, a portion of the front board only of which is shown in section. Fig. 2 is a side view of the parts shown in Fig. 1, taken from the right of Fig. 1. Fig. 3 is a front view of the parts shown in Fig. 1, said parts having been inverted. Fig. 4 is a diagram illustrating the action of the apparatus, and Fig. 5 is an elevation of the film-feeding mechanism of a consecutive-view camera arranged for taking stereoscopic pictures and provided with the improvements herein described.

In the drawings, 1 and 1' are the lens-tubes of two twin photographic lenses. They are telescopic, and racks 2 and 2', a pinion-shaft 3, having a thumb-screw 3', and pinions 4 and 4' are provided for the purpose of focusing the lenses. In front of the lens-tubes are mounted reflecting-prisms 5 and 5'. The prism 5' is secured directly to its lens-tube, while the prism 5 is mounted upon guide-rods 6, projecting from and secured to the other lens-tube in such manner that it may be moved toward or from its lens-tube upon said rods. The length of the guide-rods is such that the distance between the reflected extensions of the optical axes of the lenses may be at least as great as the distance between the axes of the lenses of an ordinary stereoscopic camera.

In Fig. 1 and also in Fig. 4 the lines 7 and 7' represent the axes of the lenses, the distance $x$ being the distance between them. The lines 8 and 8' represent reflected extensions of these axes and proceed from the central point of the reflecting-surfaces of the prisms 5 and 5'. The lines 8 and 8' may be termed "reflected optical axes." The distance $y$ is the distance between the lines 8 and 8'. It is apparent that the distance $y$ may be varied by moving the prism 5 in or out on its guides 6 without altering the distance $x$. The images projected upon the sensitive plate within the camera are substantially the same as the images which would be observed from points on rearward extensions of the lines 8 and 8' and differ from each other to the same extent that the images which might be seen from rearward extensions of the lines 8 and 8', if the prisms were removed, would differ. By moving the prism 5 in or out, therefore, the angle of divergence between the pencils of light by which the different images reflected onto the sensitive plate within the camera are produced may be varied, and by varying this angle of divergence the degree of the perspective effect produced is varied. The distance $y$ when measured close to the prism is the measure of this angle of divergence, and also serves by comparison with the distance $x$ to show the degree of concentration of the images upon the negative plate which results from the use of the prisms. From Fig. 4 it is evident that the images on the negative are very much closer together than would be the case if an ordinary stereoscopic camera, the axes of the lenses of which are as far apart as the lines 8 and 8', were used, while the effect of perspective obtained is the same as would be obtained by the use of an ordinary stereoscopic camera with the axes of its lenses as far separated as are the lines 8 and 8'. The reflection of the pencils of light by which the twin images are produced necessarily results in a crossing of the rays of each of said pencils, and therefore results in the reversal in the negative of the relations of right and left of the image from those relations which would exist in a negative made by an ordinary camera. This, however, is an advantage, for prints made from stereoscopic negatives produced in an ordinary stereoscopic camera must be cut apart, so that the twin pictures may be transposed and then reunited by mounting upon a common backing. This is well known.

The negatives made in a stereoscopic camera constructed in accordance with my invention are printed from with the emulsion side of the negative turned away from the sensitive side of the positive. Were an ordinary stereoscopic negative printed from in this manner, the right and left of each image would be transposed with respect to the right and left of the object photographed; but by reason of the reversal which takes place in the reflecting-prisms prints made in the manner described from negatives produced in my camera have the correct relation of right and left in each image, as well as the correct relation of the two images. Projection printing is preferable, however.

It is sometimes desirable to adjust the distance between the lenses, as the size of image produced sometimes varies, and for this reason the lens-tubes are mounted in separate slides 9 and 9', mounted in grooves in a plate 10, itself arranged to slide in a direction at right angles to the direction of motion of the slides 9 and 9' in grooves in a base-plate 11, adapted to be secured to the front board of the camera. By moving the plates 9 and 9' toward or from each other the distance between the lens-tube may be varied as desired, while by moving the plates up or down a vertical adjustment of the positions of the pictures may be effected.

While this invention has been shown as applied to a photographic camera, it may equally be applied to a stereoscopic exhibiting apparatus, if desired, though ordinarily this will not be necessary.

Instead of employing reflecting-prisms, as shown, mirrors may be used, the mirrors being equivalents of prisms.

In Fig. 5 I have shown the stereoscopic apparatus in use upon a consecutive-view camera, which is therefore arranged for taking stereoscopic pictures. The film-feeding mechanism of this camera is similar to that illustrated and described in the patent to Herman Casler for a kinetographic camera, No. 629,063, dated July 18, 1889. It therefore requires only general description here. 12 is a supply-spool from which the film is drawn, and 13 is a winding-up spool. 14 is a main feed-drum. 15 is an idler-roller serving to hold the film in contact with the drum on the supply side. 16 is a similar idler-roller serving to hold the film in contact with the drum on the delivery side. 17 is a plate over which the film is drawn, and 18 is a spring-catch which at intervals holds the film tightly against said plate. 19 and 20 are auxiliary feed-rolls revolving constantly at a peripheral rate much greater than that of the drum 14. When the film is held by the spring 18, they slip idly over the film. 21 is a main driving-shaft, which also carries a shutter 22 and which is connected by suitable gearing to the drum 14, to the auxiliary feed-rolls 19 and 20, and to the winding-up spool 13. It also carries an eccentric 23, by means of which the spring-catch 18 is caused to release the film at intervals. By the operation of this film-feeding mechanism the film is drawn continuously from the spool 12 and delivered continuously to the winding-up spool 13, but is caused to move intermittently across the face of the plate 17, moving only at those times when the spring-catch 18 has been moved away from said plate and then moving at a peripheral rate so great that the average rate of motion of the film over the plate 17 is equal to the rate of delivery of the film by the drum 14. Successive sections of the film, which may be considered separate view-carriers, are thus brought into the field of exposure, exposed, and then withdrawn from the field of exposure with great rapidity.

Having thus completely described my invention, what I claim, and desire to secure by Letters Patent, is—

1. In a consecutive-view stereoscopic apparatus, the combination, with stereoscopic lenses and means for passing view-carriers through the fields thereof successively, of reflectors located in the paths of the pencils of light by which the twin images are produced or observed, the distance between the points of incidence of the optical axes of said lenses on their respective reflectors, and the said lenses, being different by an amount different from the distance between the said optical axes, whereby the distance between stereoscopic views on said view-carriers may be less than the distance between the axes of the pencils of light external to the apparatus.

2. In a consecutive-view stereoscopic apparatus, the combination, with stereoscopic lenses and means for passing view-carriers through the fields thereof successively, of reflecting-prisms located in the paths of the pencils of light by which the twin images are produced or observed, the distance between the points of incidence of the optical axes of said lenses on the reflecting-surfaces of their respective reflecting-prisms, and the said lenses, being different by an amount different from the distance between the said optical axes, whereby the distance between stereoscopic views on said view-carriers may be less than the distance between the axes of the pencils of light external to the apparatus.

3. In a consecutive-view stereoscopic apparatus, the combination, with stereoscopic lenses and means for passing view-carriers through the fields thereof successively, of reflectors located in the paths of the pencils of light by which the twin images are produced or observed, one of said reflectors being adjustably mounted for the purpose of varying the distance between the pencils of light, substantially as described.

4. In a consecutive-view stereoscopic apparatus, the combination, with stereoscopic lenses and means for passing view-carriers through the fields thereof successively, of reflecting-prisms located in the paths of the pencils of light by which the twin images are produced or observed, one of said reflecting-prisms being adjustably mounted for the purpose of varying the distance between the pencils of light, substantially as described.

5. In a stereoscopic apparatus, the combination, with the lenses and lens-mountings, of reflecting-prisms intercepting the axes of said lenses and adapted to reflect rays of light passing through the lenses, one of said prisms being adjustably mounted upon guides carried by the corresponding lens-mounting, and adapted to permit adjustment of said prism in the direction of the axis of its corresponding lens, whereby the angle of divergence of the pencils of light by which the twin images are produced may be varied, substantially as described.

6. In a stereoscopic apparatus, the combination, with the lenses movably mounted and adapted to be adjusted laterally, of reflectors located in the path of rays of light passing through said lenses, one of said reflectors being movable so as to permit adjustment of the distance between the reflected optical axes of the lenses, substantially as described.

In testimony whereof I affix my signature in presence of two witnesses.

WILLIAM KENNEDY-LAURIE DICKSON.

Witnesses:
HECTOR DE CASTRO,
G. FRANZ.